(12) United States Patent
Park et al.

(10) Patent No.: US 8,968,845 B2
(45) Date of Patent: Mar. 3, 2015

(54) THERMAL TRANSFER FILM

(71) Applicants: Si Kyun Park, Uiwang-si (KR); Se Hyun Park, Uiwang-si (KR); Jung Hyo Lee, Uiwang-si (KR); Hyoung Tae Lim, Uiwang-si (KR); Seong Heun Cho, Uiwang-si (KR); Kyoung Ku Kang, Uiwang-si (KR)

(72) Inventors: Si Kyun Park, Uiwang-si (KR); Se Hyun Park, Uiwang-si (KR); Jung Hyo Lee, Uiwang-si (KR); Hyoung Tae Lim, Uiwang-si (KR); Seong Heun Cho, Uiwang-si (KR); Kyoung Ku Kang, Uiwang-si (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 94 days.

(21) Appl. No.: 13/714,632

(22) Filed: Dec. 14, 2012

(65) Prior Publication Data

US 2013/0158153 A1  Jun. 20, 2013

(30) Foreign Application Priority Data

Dec. 16, 2011  (KR) .......................... 10-2011-0136745

(51) Int. Cl.
| | |
|---|---|
| *B41M 5/46* | (2006.01) |
| *B41M 5/382* | (2006.01) |
| *B41M 5/42* | (2006.01) |
| *C09D 133/00* | (2006.01) |
| *C09D 133/04* | (2006.01) |
| *B82Y 30/00* | (2011.01) |

(52) U.S. Cl.
CPC ............. *B41M 5/42* (2013.01); *B41M 5/38242* (2013.01); *B82Y 30/00* (2013.01); *C09D 133/00* (2013.01); *Y10S 977/773* (2013.01); *B41M 5/465* (2013.01); *B41M 2205/30* (2013.01); *B41M 2205/38* (2013.01); *C09D 133/04* (2013.01)
USPC .......................... 428/32.81; 524/496; 977/773

(58) Field of Classification Search
CPC ............ B41M 5/465; B41M 5/38242; B41M 2205/30; B41M 2205/38
USPC ....................................... 428/32.81; 524/496
See application file for complete search history.

(56) References Cited

U.S. PATENT DOCUMENTS

| | | |
|---|---|---|
| 5,134,034 A | 7/1992 | Makishima et al. |
| 6,171,690 B1 | 1/2001 | Kenny |

FOREIGN PATENT DOCUMENTS

| | | |
|---|---|---|
| CN | 1469814 A | 1/2004 |
| CN | 1592524 A | 3/2005 |
| CN | 1638543 A | 7/2005 |
| CN | 1703773 A | 11/2005 |
| CN | 101283627 A | 10/2008 |
| JP | H 6-55867 A | 3/1994 |
| JP | 2001-150822 A | 6/2001 |
| JP | 2004-338304 A | 12/2004 |
| JP | 2006-133756 A | 5/2006 |
| KR | 10-2008-0063294 A | 7/2008 |

OTHER PUBLICATIONS

Chinese Office Action dated Jul. 2, 2014.

*Primary Examiner* — Bruce H Hess
(74) *Attorney, Agent, or Firm* — Lee & Morse, P.C.

(57) ABSTRACT

A thermal transfer film and a method of manufacturing an OLED display, the thermal transfer film including a light to heat conversion layer, the light to heat conversion layer being formed of a composition including carbon black having an oil absorption number (OAN) of about 50 cc/100 gram to about 120 cc/100 gram and a mean particle size of about 40 nm to about 200 nm; and a binder.

18 Claims, No Drawings

US 8,968,845 B2

THERMAL TRANSFER FILM

CROSS-REFERENCE TO RELATED APPLICATION

Korean Patent Application No. 10-2011-0136745 filed on Dec. 16, 2011, in the Korean Intellectual Property Office, and entitled: "THERMAL TRANSFER FILM," is incorporated by reference herein in its entirety.

BACKGROUND

1. Field

Embodiments relate to a thermal transfer film.

2. Description of the Related Art

In recent years, demand for compactness and high performance has been increased in various fields including optics, displays, semiconductors, and biotechnology. Thus, forming wires or functional thin films for each component in a smaller and more uniform pattern may be desirable.

Laser-induced thermal transfer may be used. In such a process, a light to heat conversion layer may absorb light in a certain wavelength range and may convert the light into heat such that a transfer material stacked on the light to heat conversion layer may be transferred to a receptor.

SUMMARY

Embodiments are directed to a thermal transfer film.

The embodiments may be realized by providing a thermal transfer film comprising a light to heat conversion layer, the light to heat conversion layer being formed of a composition including carbon black having an oil absorption number (OAN) of about 50 cc/100 gram to about 120 cc/100 gram and a mean particle size of about 40 nm to about 200 nm; and a binder.

The carbon black may be present in the light to heat conversion layer in an amount of about 0.1 wt % to about 40 wt %, based on a total solid content of the light to heat conversion layer.

The binder may include a curable resin, a polyfunctional monomer, or a mixture thereof.

The binder may be present in the composition in an amount of about 45 wt % to about 99.8 wt %, based on a total solid content of the composition.

The composition may further include a photo initiator.

The light to heat conversion layer may further include a dispersant.

The light to heat conversion layer may further include a dye, a pigment, or a mixture thereof.

The embodiments may also be realized by providing a thermal transfer film including a base film; a light to heat conversion layer stacked on the base film, the light to heat conversion layer being formed of a composition including carbon black having an oil absorption number (OAN) of about 50 cc/100 gram to about 120 cc/100 gram and a mean particle size of about 40 nm to about 200 nm, and a binder; and a transfer layer stacked on the light to heat conversion layer.

The embodiments may also be realized by providing a thermal transfer film including a base film; a light to heat conversion layer stacked on the base film, the light to heat conversion layer being formed of a composition including carbon black having an oil absorption number (OAN) of about 50 cc/100 gram to about 120 cc/100 gram and a mean particle size of about 40 nm to about 200 nm, and a binder; an interlayer stacked on the light to heat conversion layer; and a transfer layer stacked on the interlayer.

The embodiments may also be realized by providing a method of manufacturing an OLED display, the method including using the thermal transfer film according to an embodiment to transfer a donor film

DETAILED DESCRIPTION

Example embodiments will now be described more fully hereinafter; however, they may be embodied in different forms and should not be construed as limited to the embodiments set forth herein. Rather, these embodiments are provided so that this disclosure will be thorough and complete, and will fully convey the scope of the invention to those skilled in the art.

It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present.

A thermal transfer film according to an embodiment may include a light to heat conversion layer. The light to heat conversion layer may be formed of a composition including, e.g., carbon black (having an oil absorption number (OAN) of about 50 cc/100 g to about 120 cc/100 g and a mean particle size of about 40 nm to about 200 nm); and a binder.

Carbon black may be a light to heat conversion material used for a light to heat conversion layer. Upon receiving light, the carbon black may convert the light energy into thermal energy so as to facilitate transferring a transfer layer (stacked on the light to heat conversion layer and including a transfer material, e.g., an electroluminescent material) to other matrices or substrates.

Carbon black may be prepared through incomplete combustion or thermal decomposition of a carbon compound. Thus, the carbon black may agglomerate due to characteristics of the preparation process. As a result, the carbon black may exhibit low dispersibility, thereby causing a reduction in thermal transfer efficiency and providing non-uniform transfer of the transfer layer.

According to an embodiment, the oil absorption number and the mean particle size of the carbon black may be adjusted to help increase dispersibility and optical density (OD) of the carbon black, thereby improving thermal transfer efficiency.

The oil absorption number may refer to a physical property of carbon black and may be given by an amount (cc) of oil used for making a hard carbon black paste when 100 g of the carbon black is kneaded with oil. The oil absorption number of carbon black may be measured using an absorptometer. In an implementation, the oil absorption number of carbon black may be measured according to ASTM D2414.

The term "mean particle size" may refer to an average particle size or diameter of carbon black particles. The mean particle size of carbon black may be measured using a particle size analyzer. In an implementation, the mean particle size of carbon black may be measured according to ASTM D3849.

As described above, the carbon black may have an oil absorption number of about 50 cc/100 g to about 120 cc/100 g. Maintaining the oil absorption number of the carbon black at about 50 cc/100 g or greater may help prevent deterioration of dispersibility of the carbon black. Maintaining the oil absorption number of the carbon black at about 120 cc/100 g or less may help prevent an undesirable reduction in optical density that may result from a reduction in degree of blackness. In an implementation, the carbon black may have an oil absorption number of about 65 cc/100 g to about 120 cc/100 g.

As described above, the carbon black may have a mean particle size of about 40 nm to about 200 nm. Maintaining the mean particle size of the carbon black at about 40 nm or greater may help prevent an undesirable reduction of adhesion caused by dispersibility deterioration and UV light blocking. Maintaining the mean particle size of the carbon black at about 200 nm or less may help prevent an undesirable reduction in optical density resulting from reduction in blackness. In an implementation, the carbon black may have a mean particle size of about 58 nm to about 100 nm.

The carbon black may be present in the light to heat conversion layer in an amount of about 0.1 wt % to about 40 wt %, based on a total solid content of the light to heat conversion layer. Within this range, the carbon black may form a matrix of a stable light to heat conversion layer and provide good dispersibility, thereby improving thermal transfer efficiency. In an implementation, the carbon black may be present in the light to heat conversion layer in an amount of about 10 to about 20 wt %, e.g., about 10 wt % to about 15 wt %.

The composition for forming the light to heat conversion layer may further include the binder, in addition to the carbon black.

The carbon black may be present in the composition in an amount of about 0.1 wt % to about 40 wt %, based on a total solid content of the composition. Within this range, the carbon black may form a matrix of a stable light to heat conversion layer and provide good dispersibility, thereby improving thermal transfer efficiency. In an implementation, the carbon black may be present in the composition in an amount of about 10 to about 20 wt %, e.g., about 10 wt % to about 15 wt %.

The binder may act as an adhesive component with respect to a base film and a transfer material that includes, e.g., an organic EL material. The binder may include, e.g., a curable resin, a polyfunctional monomer, or a mixture thereof.

The curable resin may comprise one or more of UV-curable resin and thermally curable resin.

The UV-curable resin may include, e.g., at least one selected from the group of acrylic resins, phenolic resins, polyvinyl butylral resins, polyvinyl acetates, polyvinyl acetals, polyvinylidene chlorides, cellulose ethers and esters, nitrocelluloses, polycarbonates, polyalkyl (meth)acrylates, epoxy (meth)acrylates, epoxy resins, urethane resins, ester resins, ether resins, alkyd resins, spiroacetal resins, polybutadienes, polythiolpolyenes, (meth)acrylate resins of polyfunctional compounds such as polyhydric alcohols, and acrylic resins.

The thermally curable resin may include, e.g., at least one selected from the group of urethane polyester, and chlorinated polyethylene.

The polyfunctional monomer may include, e.g., a bi- or more-functional, tri- or more-functional, or a hexa- or more functional monomer. For example, the polyfunctional monomer may include at least one selected from the group of polyfunctional (meth)acrylate monomers and fluorine modified polyfunctional (meth)acrylate monomers.

Examples of the polyfunctional monomer may include polyfunctional (meth)acrylate monomers selected from the group of ethylene glycol di(meth)acrylate, diethylene glycol di(meth)acrylate, triethylene glycol di(meth)acrylate, 1,4-butanediol di(meth)acrylate, 1,6-hexanediol di(meth)acrylate, neopentyl di(meth)acrylate, pentaerythritol di(meth)acrylate, pentaerythritol tri(meth)acrylate, dipentaerythritol di(meth) acrylate, dipentaerythritol tri(meth)acrylate, dipentaerythritol penta(meth)acrylate, dipentaerythritol hexa(meth)acrylate, bisphenol-A di(meth)acrylate, trimethylolpropane tri (meth)acrylate, ditrimethylolpropane tetra(meth)acrylate, novolac epoxy(meth)acrylate, propylene glycol di(meth) acrylate, 1,4-butanediol di(meth)acrylate, 1,6-hexanediol di(meth)acrylate; fluorine modified polyfunctional (meth) acrylate monomers prepared by fluorine modification of the polyfunctional (meth)acrylate monomer, and the like.

The binder may be present in the composition in an amount of about 45 wt % to about 99.8 wt %, based on the total solid content of the composition. Within this range, the composition may form a matrix of a stable light to heat conversion layer. In an implementation, the binder may be present in the composition in an amount of about 70 wt % to about 90 wt %, e.g., about 80 wt % to about 90 wt %.

The binder may be present in the light to heat conversion layer in an amount of about 45 wt % to about 99.8 wt %, based on the total solid content of the light to heat conversion layer. Within this range, the composition may form a matrix of a stable light to heat conversion layer. In an implementation, the binder may be present in the light to heat conversion layer in an amount of about 70 wt % to about 90 wt %, e.g., about 80 wt % to about 90 wt %.

The composition may further include a photo initiator.

In the light to heat conversion layer of the thermal transfer film, the photo-initiator may help increase hardness of the thermal transfer film by curing the binder upon UV irradiation.

The photo initiator may include any suitable photo initiator, e.g., benzophenone compounds such as 1-hydroxy cyclohexyl phenyl ketone.

The photo initiator may be present in the composition in an amount of about 0.1 wt % to about 15 wt %, based on the total solid content of the composition. Within this range, the photo initiator may provide sufficient hardness to the thermal transfer film and may not remain as an impurity, which may cause deterioration in hardness of the light to heat conversion layer. In an implementation, the photo-initiator may be present in the composition in an amount of about 0.5 wt % to about 12 wt %, e.g., about 0.5 wt % to about 1 wt %.

The photo initiator may be present in the light to heat conversion layer in an amount of about 0.1 wt % to about 15 wt %, based on the total solid content of the light to heat conversion layer. Within this range, the photo initiator may provide sufficient hardness to the thermal transfer film and may not remain as an impurity, which may cause deterioration in hardness of the light to heat conversion layer. In an implementation, the photo-initiator may be present in the light to heat conversion layer in an amount of about 0.5 wt % to about 12 wt %, e.g., about 0.5 wt % to about 1 wt %.

The light to heat conversion layer may further include a dispersant. The dispersant may help suppress agglomeration of the carbon black, thereby improving thermal transfer efficiency.

The dispersant may include any suitable dispersant, e.g., conductive polymers selected from the group of polyaniline, polythiophene, polypyrrol and derivatives thereof; semi-conductive polymers selected from the group of polyphenylene, poly(phenylenevinylene), polyfluorene, poly(3,4-di-substituted thiophene), polybenzothiophene, polyiso-thianaphthene, polypyrrol, polyfuran, polypyridine, poly-1,3,4-oxadiazole, polyazulene, polyselenophene, polybenzofuran, polyindole, polypyridazine, polypyrene, polyaryl amine, and derivatives thereof; and polyvinylacetate and copolymers thereof.

The dispersant may be present in an amount of about 0.05 parts by weight to 150 parts by weight, based on 100 parts by weight of a solid content of the carbon black. In an implementation, the dispersant may be present in an amount of about 0.1 parts by weight to about 120 parts by weight. Within this range, the dispersant may help improve dispersibility of carbon black and thermal transfer efficiency.

The light to heat conversion layer may further include pigments, dyes, or mixtures thereof, besides the carbon black. The pigments, dyes, or mixtures thereof may include any suitable pigments, dyes, or mixtures thereof used for a light to heat conversion layer. The pigments, dyes, or mixtures thereof may include in an amount that ensures that dispersibility of carbon black and thermal transfer efficiency are not deteriorated.

In an implementation, the pigment or dye may include a pigment or dye having visible or near-infrared absorption wavelengths.

The dye may include, e.g., at least one selected from the group of diimmonium dyes, metal-complex dyes, naphthalocyanine dyes, phthalocyanine dyes, polymethine dyes, anthraquinone dyes, porphyrin dyes, and cyanine dyes in the form of metal-complexes.

The pigment may include, e.g., at least one selected from the group of metal oxide pigments, metal sulfide pigments, and graphite pigments.

The dyes, pigments, or mixtures thereof may be present in an amount of about 10 to about 100 parts by weight, based on 100 parts by weight of carbon black. Within this range, it is possible to improve thermal transfer efficiency without deteriorating dispersibility of carbon black.

In an uncured state, the composition for the light to heat conversion layer may include a solvent, e.g., methylethylketone, butyl acetate, ethylcellosolve, ethylcellosolve acetate, ethylcarbitol, ethylcarbitol acetate, diethyleneglycol, cyclohexanone, lactate ester, and mixtures thereof.

The light to heat conversion layer may be prepared by coating the composition on a base film, followed by drying and curing by laser irradiation at about 100 mJ/cm$^2$ to about 500 mJ/cm$^2$.

The light to heat conversion layer may have a thickness of about 1 μm to about 10 μm. Within this range, the light to heat conversion layer may facilitate efficient thermal transfer. In an implementation, the light to heat conversion layer may have a thickness of about 2 μm to about 5 μm.

The thermal transfer film may include the light to heat conversion layer and a transfer layer sequentially stacked on a base film. The transfer layer may include a transfer material, which may include, e.g., an organic electroluminescent (EL) material. With the transfer layer adjoining or contacting a surface of a receptor having a certain pattern, laser light having a certain wavelength may be irradiated to the thermal transfer film. Then, the light to heat conversion layer may absorb heat energy and may expand in response to the heat, and the transfer material of the transfer layer may be thermally transferred to the receptor so as to correspond to the pattern.

The base film may provide good adhesion with respect to the light to heat conversion layer and may control thermal transfer to the light to heat conversion layer and other layers. The base film may be composed of at least one transparent polymer film selected from the group of polyester, polyacrylic, polyepoxy, polyethylene, polypropylene, and polystyrene films. In an implementation, the base film may be a polyester, polyethylene terephthalate, or polyethylene naphthalate film.

The base film may have a thickness of about 10 μm to about 500 μm. In an implementation, the base film may have a thickness of about 30 μm to about 500 μm, e.g., about 40 μm to about 100 μm.

The transfer layer may include the transfer material to be transferred therein to the receptor. Such a layer may be formed of organic, inorganic, metal, or other materials including electroluminescent materials or electrically active materials.

The transfer layer may be uniformly coated on the light to heat conversion layer via, e.g., evaporation, sputtering, or solvent coating of the transfer material. In an implementation, the transfer layer may be coated in a predetermined pattern on the light to heat conversion layer via, e.g., digital printing, lithography printing, evaporation, or sputtering through a mask of the transfer material.

In an implementation, the thermal transfer film may further include an interlayer between the light to heat conversion layer and the transfer layer. The interlayer may help reduce and/or prevent damage or contamination of the transfer material of the transfer layer, and may help reduce distortion of the transfer material of the transfer layer. Further, the interlayer may help improve adhesion of the transfer layer to the light to heat conversion layer and may help control release of the transfer layer at a portion of the receptor on which the pattern is formed and at a portion of the receptor on which the pattern is not formed.

The interlayer may include, e.g., an organic material including a polymer film, a metal layer, inorganic layers (e.g., layers formed by sol-gel deposition and vapor deposition of inorganic oxide, for example, silica, titania, and other metal oxides), and/or an organic/inorganic combination layer. The organic material may include, e.g., thermosetting and/or thermoplastic materials.

The thermal transfer film according to an embodiment may be applied to a thermal transfer donor film for OLED color patterning.

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

EXAMPLES

Specifications of components used in the following Examples and Comparative Examples were as follows.

(A) Carbon black: Carbon black having specifications shown in Table 1 was used. The carbon black was obtained in the form of a mill base including carbon black, a dispersant (polyvinyl acetate), and a solvent (methylethylketone).

TABLE 1

|  | Mean particle size (nm)* | Oil absorption number (cc/100 g)** | Product Name | Manufacturer |
|---|---|---|---|---|
| (A1) | 65 | 65 | Raven450 | Columbia |
| (A2) | 100 | 65 | Copeblack25 | Columbia |
| (A3) | 58 | 120 | Copeblack49 | Columbia |
| (A4) | 20 | 60 | Raven1200 | Columbia |
| (A5) | 42 | 170 | Conductex7055 | Columbia |

TABLE 1-continued

| | Mean particle size (nm)* | Oil absorption number (cc/100 g)** | Product Name | Manufacturer |
|---|---|---|---|---|

*mean particle size was measured according to ASTM D3849.
**oil absorption number was measured according to ASTM D2414.
(B) Binder: Acrylic binder (IRG-205, Nippon Kayaku Co., Ltd.)
(C) Photo initiator: Irgacure 184 (BASF Co., Ltd.)
(D) Base film: Polyethylene terephthalate film (PET, A4300, Toyobo Co., Ltd., thickness of 75 μm)

Example 1

87.0 parts by weight of a binder, 19.5 parts by weight of a mill base (including 12.4 parts by weight of carbon black (A1)), and 0.6 parts by weight of a photo initiator were provided to 100 parts by weight of a methylethylketone solvent. The resultant was stirred for 30 minutes to prepare a composition for a light to heat conversion layer.

The composition was deposited on a base film using a wired bar coater No. 7, followed by drying in an oven at 80° C. for 2 minutes. The resultant was cured at 300 mJ/cm² under a nitrogen atmosphere, forming a 5 μm thick light to heat conversion layer.

Examples 2 and 3

Light to heat conversion layers were formed by the same method as in Example 1 except that carbon black was used as listed in Table 2.

Comparative Examples 1 and 2

Light to heat conversion layers were formed by the same method as in Example 1, except that carbon black was used as listed in Table 2.

<Property Evaluation>

The prepared light to heat conversion layers were subjected to evaluation of physical properties as follows, and the results are shown in Table 2.

(1) Optical density (OD): The optical density of the 5 μm thick light to heat conversion layer was measured using a Perkin Elmer Lambda 950 UV-VIS spectrometer at 970 nm.

(2) Adhesion: A specimen having a 5 μm thick light to heat conversion layer on a base film was bent in half on the light to heat conversion layer. A weight of 1 kg was placed on the bent specimen and removed therefrom after 10 minutes. No separation of the light to heat conversion layer from the base film was evaluated as o and separation of the light to heat conversion layer therefrom was evaluated as x.

(3) Cross cut: A specimen having a 5 μm thick light to heat conversion layer on a base film was cut into 100 cells having a size of 1 mm×1 mm using a cutter. A 3M tape was attached to the cells and removed therefrom after 5 minutes. The number of cells remaining on the tape was counted.

TABLE 2

| | | Example | | | Comparative Example | |
|---|---|---|---|---|---|---|
| | | 1 | 2 | 3 | 1 | 2 |
| (A) | (A1) | 12.4 | — | — | — | — |
| | (A2) | — | 12.4 | — | — | — |
| | (A3) | — | — | 12.4 | — | — |
| | (A4) | — | — | — | 12.4 | — |
| | (A5) | — | — | — | — | 12.4 |
| (B) | | 87.0 | 87.0 | 87.0 | 87.0 | 87.0 |
| (C) | | 0.6 | 0.6 | 0.6 | 0.6 | 0.6 |
| OD (2.0 ± 0.2) | | 2.0 | 1.85 | 1.9 | 2.2 | 1.2 |
| Adhesion | | o | o | o | x | x |
| Cross cut (number) (remaining number/total number) | | 100/100 | 100/100 | 100/100 | 54/100 | 82/100 |

As may be seen in Table 2, the light to heat conversion layer of the Examples (including the carbon black according to an embodiment) exhibited better adhesion and cross-cut properties than the light to heat conversion layer of the Comparative Examples upon UV irradiation at the same wavelength.

By way of summation and review, in one type of light to heat conversion layer, dyes or pigments may be used as materials for converting absorbed light energy to thermal energy. However, dyes may decompose, thereby causing deterioration in lifespan of the light to heat conversion layer. In addition, the dyes or pigments may have a complex molecular structure, which may be difficult to synthesize.

Carbon black may be easily prepared through incomplete combustion or thermal decomposition of carbon compounds, and thus may be easy to prepare and/or purchase. However, carbon black may agglomerate due to process characteristics, thereby exhibiting poor dispersibility. In addition, dispersibility may be severely deteriorated when carbon black is mixed with other components, e.g., a binder, a photo initiator, or the like in preparation of the light to heat conversion layer.

The embodiments provide a thermal transfer film, which includes a light to heat conversion (LTHC) layer including a certain amount of carbon black having a predetermined oil absorption number (OAN) and a mean particle size in a particular range, thereby improving dispersibility of the carbon black, improving thermal transfer efficiency, adhesion, and cross-cut properties, and facilitating uniform transfer of a transfer layer.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A thermal transfer film, comprising:
   a base film;
   a light to heat conversion layer stacked on the base film, the light to heat conversion layer being formed of a composition including:
      carbon black having an oil absorption number (OAN) of about 50 cc/100 gram to about 120 cc/100 gram and a mean particle size of about 40 nm to about 200 nm, and
      a binder, and
   a transfer layer stacked on the light to heat conversion layer.

2. The thermal transfer film as claimed in claim 1, wherein the carbon black is present in the light to heat conversion layer in an amount of about 0.1 wt % to about 40 wt %, based on a total solid content of the light to heat conversion layer.

3. The thermal transfer film as claimed in claim 1, wherein the binder includes a curable resin, a polyfunctional monomer, or a mixture thereof.

4. The thermal transfer film as claimed in claim 1, wherein the binder is present in the composition in an amount of about 45 wt % to about 99.8 wt %, based on a total solid content of the composition.

5. The thermal transfer film as claimed in claim 1, wherein the composition further includes a photo initiator.

6. The thermal transfer film as claimed in claim 1, wherein the light to heat conversion layer further includes a dispersant.

7. The thermal transfer film as claimed in claim 1, wherein the light to heat conversion layer further includes a dye, a pigment, or a mixture thereof.

8. A method of manufacturing an OLED display, the method comprising irradiating the thermal transfer film as claimed in claim 1 to transfer the transfer layer from the thermal transfer film to a substrate.

9. The method as claimed in claim 8, wherein the transfer layer includes an electroluminescent material.

10. The thermal transfer film as claimed in claim 1, wherein the light to heat conversion layer further includes a dye, a pigment, or a mixture thereof.

11. A thermal transfer film, comprising:
   a base film;
   a light to heat conversion layer stacked on the base film, the light to heat conversion layer being formed of a composition including:
      carbon black having an oil absorption number (OAN) of about 50 cc/100 gram to about 120 cc/100 gram and a mean particle size of about 40 nm to about 200 nm, and
      a binder,
   an interlayer stacked on the light to heat conversion layer; and
   a transfer layer stacked on the interlayer.

12. A method of manufacturing an OLED display, the method comprising irradiating the thermal transfer film as claimed in claim 11 to transfer the transfer layer from the thermal transfer film to a substrate.

13. The method as claimed in claim 12, wherein the transfer layer includes an electroluminescent material.

14. The thermal transfer film as claimed in claim 11, wherein the carbon black is present in the light to heat conversion layer in an amount of about 0.1 wt % to about 40 wt %, based on a total solid content of the light to heat conversion layer.

15. The thermal transfer film as claimed in claim 11, wherein the binder includes a curable resin, a polyfunctional monomer, or a mixture thereof.

16. The thermal transfer film as claimed in claim 11, wherein the binder is present in the composition in an amount of about 45 wt % to about 99.8 wt %, based on a total solid content of the composition.

17. The thermal transfer film as claimed in claim 11, wherein the composition further includes a photo initiator.

18. The thermal transfer film as claimed in claim 11, wherein the light to heat conversion layer further includes a dispersant.

* * * * *